United States Patent [19]

Feng

[11] 4,132,864
[45] Jan. 2, 1979

[54] DIGITAL MEASUREMENT OF THE DC VALUE IN AN AC SIGNAL ADAPTED TO TELEPHONE OFF-HOOK DETECTION

[75] Inventor: Joseph S. Feng, White Plains, N.Y.

[73] Assignee: International Business Machines Corporation, Armonk, N.Y.

[21] Appl. No.: 792,079

[22] Filed: Apr. 28, 1977

[51] Int. Cl.² .................... H04M 3/22; G04F 9/00
[52] U.S. Cl. .......................... 179/18 FA; 324/186
[58] Field of Search ............ 179/18 F, 18 FA, 81 R, 179/84 R, 18 HB, 175.2 B; 324/186

[56] References Cited

U.S. PATENT DOCUMENTS

| 3,735,263 | 5/1973 | Boatwright | 324/186 |
| 3,851,108 | 11/1974 | Freimanis | 179/18 F |

*Primary Examiner*—Thomas A. Robinson

*Attorney, Agent, or Firm*—Graham S. Jones, II

[57] ABSTRACT

The duty cycle of an AC telephone off-hook signal is measured by means of comparing it with the duty cycle of a known AC signal having a duty cycle of 0.5 because it has a DC component of zero. Measurement of the duty cycle in a telephone off-hook detector application involves measuring the DC portion of the signal on a pair of telephone lines from a telephone handset to an exchange. A high frequency master clock oscillator with a much higher frequency than the basic ringing voltage is used. An input signal is used to gate clock pulses to a counter when the input signal is positive. At the end of a predetermined number of clock pulses, the counter is gated into memory connected to a decoder for transmission of the decoded signal to the exchange for appropriate action.

7 Claims, 8 Drawing Figures

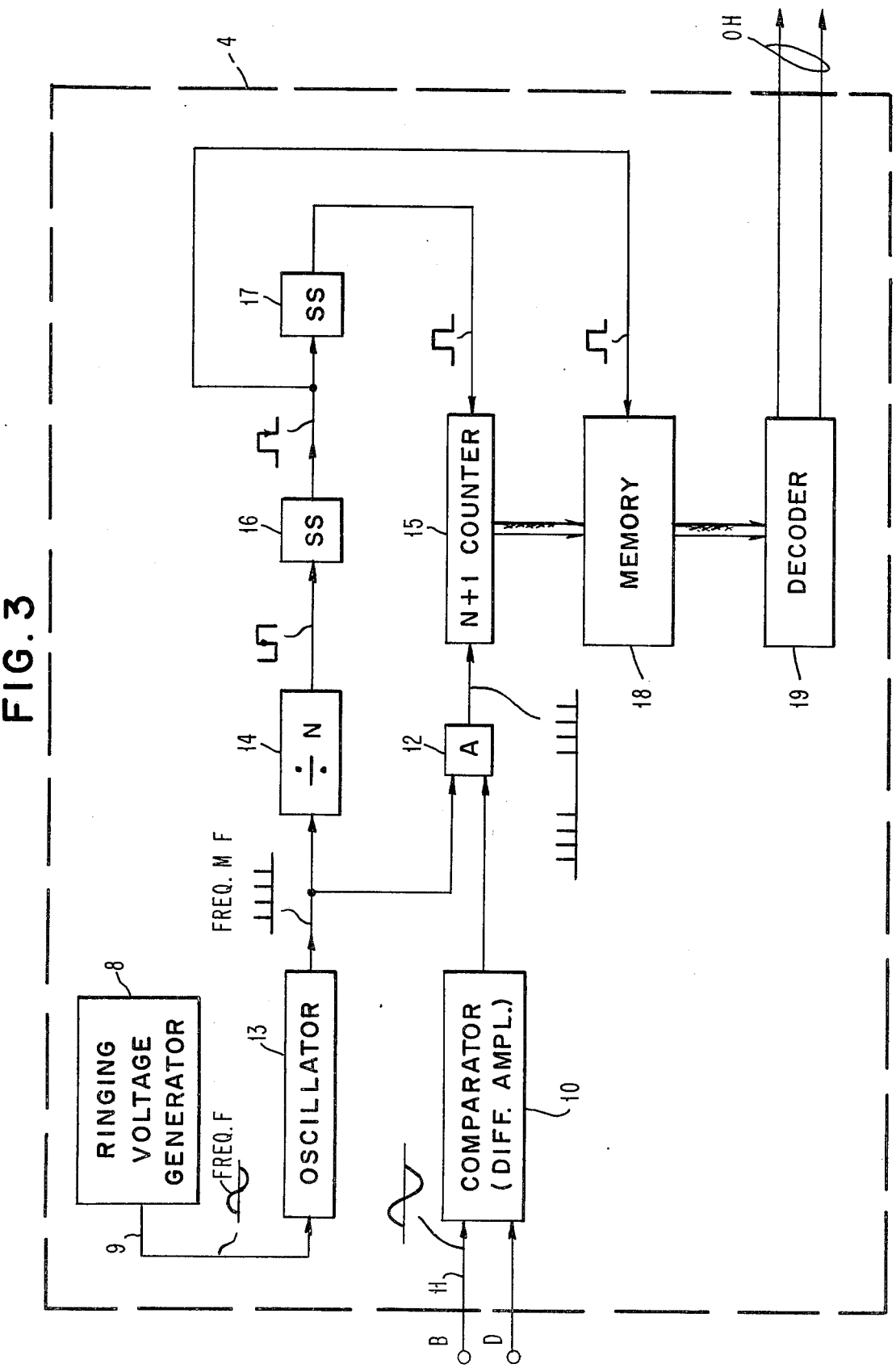

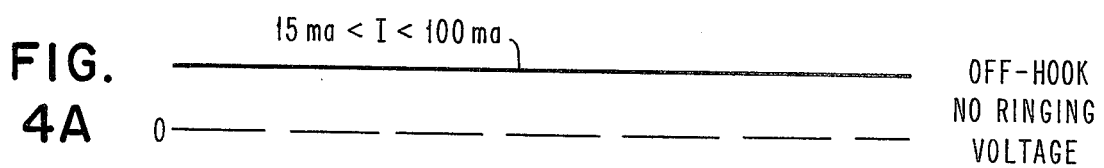
FIG. 4A — OFF-HOOK NO RINGING VOLTAGE ($15\,ma < I < 100\,ma$)
FIG. 4B — ON-HOOK NO RINGING VOLTAGE
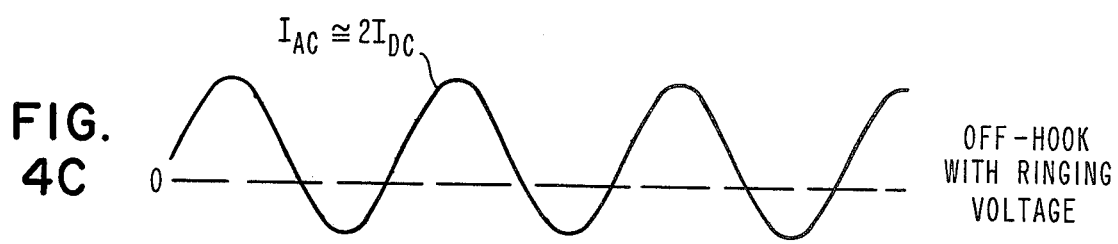
FIG. 4C — OFF-HOOK WITH RINGING VOLTAGE ($I_{AC} \cong 2I_{DC}$)
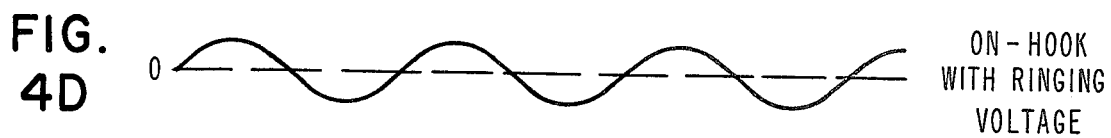
FIG. 4D — ON-HOOK WITH RINGING VOLTAGE

DIGITAL MEASUREMENT OF THE DC VALUE IN AN AC SIGNAL ADAPTED TO TELEPHONE OFF-HOOK DETECTION

BACKGROUND OF THE INVENTION

1. Field of the Invention

This invention relates to telephony systems and more particularly to automatic systems for detecting the off-hook condition of a telephone unit.

2. Description of the Prior Art

U.S. Pat. No. 3,205,312 of Brightman et al entitled "Off-Hook Detector" describes a method of charging a capacitor periodically which discharges through a transformer at a variable rate depending upon whether the telephone is on or off the hook. The potential on the capacitor is monitored periodically to compare its potential with a predetermined value.

U.S. Pat. No. 3,720,793 of Hofmann entitled "Supervisory Circuit Arrangement for Telephone Subscriber Lines" includes an off-hook sensor which uses mechanical transfer relays, which involve the usual type of high energy use, mass, copper requirements, size and reliability problems to sample the surging current during the first part of each positive half-wave of a ringing signal.

U.S. Pat. No. 3,835,258 of Le Cardonnel entitled "Ring Trip Circuit" employs a filter F, oscillator O, transformer TR, a rectifier RE and a switching device CO with a transistor switch which operates a relay O.

U.S. Pat. No. 3,735,263 of Boatwright entitled "Digital Analysis of Electric Wave Signals" teaches producing a fixed number of pulses per cycle of the incoming waveform for measuring the duty cycle of only a repetitive signal. A sum of the total duration of the period of a signal is accumulated into a first register. A second series of pulses is accumulated into a second register in an amount equal to the duration of the active portion of the signal. Then a reversible counting step for counting down the second register for the active portion while measuring time with pulses from the first register. At least two full cycles of operation are required for the result to be obtained which includes a substantial built-in time delay in achieving the desired result.

SUMMARY OF THE INVENTION

Since each telephone line in a telephone system should be capable of independent operation, a central telephone exchange must be able to interrogate each and every telephone line separately to determine whether or not a telephone receiver has been lifted off its hook. This obviously requires that an off-hook sensor be attached to every subscriber telephone line. One time-honored implementation has been to connect a relay coil in series with the line to sense the presence of a DC current when the receiver is off the hook.

In this modern era, it is desirable to reduce energy and material costs and conserve space and natural resources by miniaturizing a function through the use of solid state technology.

The basic problem is the rapid detection of the 20-80 mA DC that is present when a customer lifts a telephone receiver from its cradle. The most significant difficulty is that this must be done rapidly, and especially in the presence of a bell ringing current whose peak-to-peak value is about five times larger than the DC component. Quick recognition of the off-hook condition guarantees that the ringing voltage will have been disconnected before the receiver reaches the customer's ear.

In addition, it should provide some degree of electrical isolation between the subscriber line and the output so the two circuits can be separated. This should also reduce the possibility of a catastrophic failure propagating into the rest of the circuitry even though the subscriber lines are sometimes exposed to excessive common-mode voltages from natural sources.

We have found that a magnetoresistive bridge can be used to detect the current in the line. This automatically provides a degree of isolation between the subscriber line and the rest of the circuitry. In addition, the bridge can be designed to respond to the total current in one wire of the line or to the differential current in the two wires.

An appropriate MR bridge for this application has elements with 10K ohms resistance and operates from a 10V supply. In a bridge designed specially for this application a 300 mA peak input current produces a differential output voltage of 100 mV, while the minimum DC current to be sensed of 20 mA produces a 20 mV signal. The desired response time is less than two cycles of the ringing voltage frequency and the output is at logical levels.

A digital approach is used to sense the presence of a DC off-hook current, both in the presence and absence of a bell-ringing current. The response time is less than two cycles of the ringing voltage. The off-hook indication is a logical one, "1," output level. The cost of the frequently replicated parts can probably be significantly reduced by using modern large scale integration techniques.

Digital Approach

The ultimate purpose of any engineering effort is either to improve performance, reduce costs, or both. The advantages of using digital electronics in this design are a reduction in the numbers of critical manufacturing processes and manual adjustments and the possibility of using large scale integration techniques.

This design is based on the observation that the admittance of a telephone in its off-hook state is dominated by the conductance of the DC path. Thus, the impedance of a complete subscriber loop is also dominated by the resistance of the DC path. In a purely resistive network, the nominal DC current will be 38% of the peak AC ringing current, independent of the loop resistance. Assuming a sine wave ringing current and positive polarity DC current, the off-hook current waveform will be positive for 62½ % of a cycle in the presence of a ringing current and for 100% of a cycle in the absence of the ringing current. The on-hook waveform will be either zero current or a sine wave symmetrical around zero.

The idea of this digital design is to measure the fraction of time for which the current waveform is positive. A critical aspect of this design is the input circuit. The comparator input must be slightly offset so zero signal just produces a logical zero output and a symmetric sine wave input produces a square wave with very nearly 50% duty cycle. An off-hook state will then produce a waveform with either 62% or 100% duty cycle, depending on whether or not the ringing voltage is applied. Once these waveforms are generated, it is a relatively straightforward digital process to detect an off-hook state.

The circuit is designed with symmetrical operating margins.

The threshold for detecting an off-hook state is 57%, while the off-hook condition nominally produces a duty cycle of 62% or greater. This allows the circuit to detect off-hook currents that are as small as 23% of the peak ringing current. So long as 60% of the loop resistance is outside the customer's telephone and the supply and ringing voltages are maintained, the DC component cannot fall below this fraction.

In accordance with this invention, apparatus is provided for measuring the DC component of an electrical waveform on a telephone line. Means are provided for coupling to the telephone line to detect an electrical waveform present on the line to provide an input signal to a means for comparing. Means for generating a reference signal having a relatively high frequency as compared with the frequency of the electrical waveform is also coupled to the means for comparing which compares the input signal with the reference signal to indicate the value of the DC component with respect to the reference signal.

BRIEF DESCRIPTION OF THE DRAWINGS

FIG. 3 shows off-hook logic in accordance with FIG. 1.

FIGS. 4A–4D show current waveforms for a telephone line in off-hook and on-hook conditions in the presence and absence of a telephone ringing signal, respectively, as indicated thereon.

DESCRIPTION OF A PREFERRED EMBODIMENT

Figure 1:
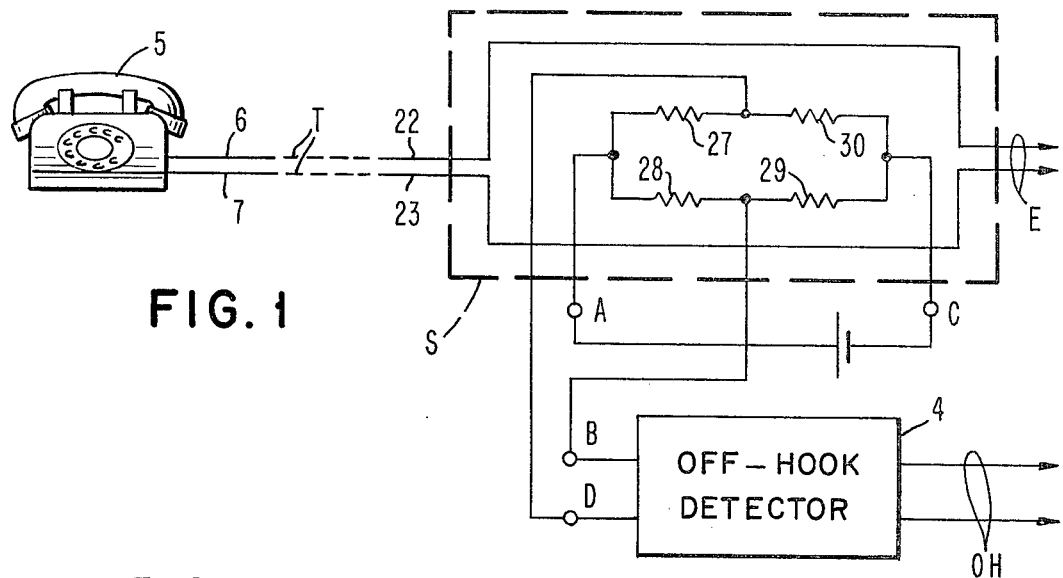
FIG. 1 shows a schematic block diagram of a system designed in accordance with this invention.

FIG. 1 shows a telephone hand set 5 connected by tip and ring lines 6 and 7 via the telephone transmission lines T and lines 22 and 23 to off-hook sensor S connected to off-hook detector 4.

Figure 2A:
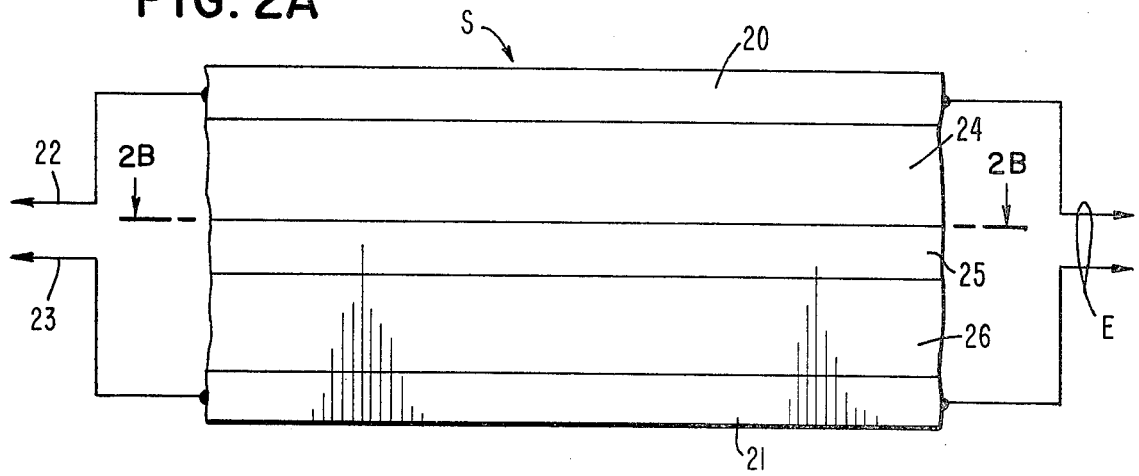
FIG. 2A shows a sectional view of a telephone line magnetoresistive sensor adapted for use in accordance with this invention.
Figure 2B:
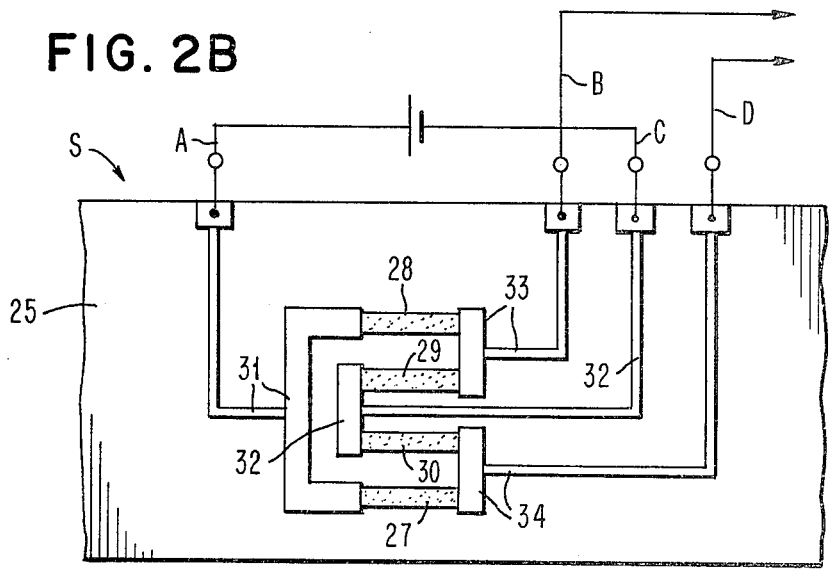
FIG. 2B shows a section along line 2B—2B in FIG. 2A.

The off-hook sensor S is shown in greater detail in FIGS. 2A and 2B. A pair of strip line conductors 20 and 21 are connected by conductors 22 and 23 to the transmission lines T from telephone hand set 5. The strip lines 20 and 21 have insulation layers 24 and 26 between them, which, in turn, have magnetoresistive sensor layer 25 sandwiched between them. Layers 24 and 26 are composed of a good dielectric such as $SiO_2$ or $Al_2O_3$.

FIG. 2B is a section along lines 2B—2B in FIG. 2A which shows an actual arrangement of a magnetoresistive sensor bridge with a battery connected via lines A and C to metallization lines 31 and 32 connected to opposite ends of the Wheatstone bridge formed by resistors 27, 28, 29 and 30 which are all parallel with each other and which extend along the length of the stripline structure shown in FIG. 2A, so that they measure the currents passing through the stripline by electromagnetic coupling. The junction of magnetoresistors 28 and 29 is connected by metallization lines 33 to a pad formed of metal to which is soldered a lead B to detector 4 in FIG. 1. The junction of magnetoresistors 27 and 30 is connected by metallization lines 34 to a pad formed of metal to which is soldered a lead D, which is also connected to detector 4.

This apparatus provides phase-independent detection of the DC components included with an AC signal. The duty cycle (fraction of time during the cycle of a waveform that the waveform has a positive value) of an unknown AC signal can be measured by means of comparing it with the duty cycle of a known AC signal having a duty cycle of 0.5 because it has a DC component of zero. This apparatus is particularly adapted to rapid detection of an off-hook signal in a telephone system.

In some applications, a DC component must be detected in a waveform with a larger AC component. This is most commonly done by filtering the signal to eliminate the high frequency components. The transient response of such a network is approximately limited to $1/f_c$, where $f_c$ is the corner frequency of the low-pass filter. A system requiring rapid response could be made using a complex, multi-pole filter, allowing $f_c$ to approach the frequency of the first AC component to be effectively filtered.

In cases in which the waveform of the AC component is known, a priori, it is possible continually to test the waveform against a reference. The response time is limited by the sampling rate, but hardware costs for such a device are high. The alternative of sampling at the zero crossings of the AC waveform involves less costly circuits and reduces the average response time to one-quarter of the period of the waveform. Both methods require circuits that operate in phase synchronization with the incoming waveform.

This apparatus uses a phase-independent method for detecting a DC component in an average response time of less than one period of the AC waveform. In some special cases, the magnitude of this DC component can be inferred easily by knowing the absolute amplitude of the AC signal.

Assume that the AC waveform is a sine wave with peak amplitude. A sine wave has a duty cycle of 0.5. Adding a positive DC component D, where $D<A$, will increase the duty cycle by $[\sin^{-1}(D/A)]/\pi$, where $\sin^{-1}x$ is in radians. Similarly, for a triangle wave of peak amplitude A, the DC component will increase the duty cycle by $D/2A$. However, this method cannot be applied when the AC signal is a square wave because there will be discontinuous changes in the duty cycle.

The method of detecting and measuring the relative DC component consists of measuring the duty cycle, as defined above, of the waveform. The only requirement on the AC waveform is that it be reasonably continuous in the region of the zero crossing, where term "reasonably continuous" is meant to exclude square waves, pulses, etc. This method requires inspecting the waveform for one complete cycle, but the inspection period need not have any particular phase relationship to the AC waveform.

The digital method for measuring or detecting the DC signal consists of using the duty cycle of the waveform to gate the output of an oscillator operating at M times the fundamental frequency of the AC signal. The gated output is counted for N counts of the oscillator, with $M \simeq N$. If K is the number of output counts per N cycles, the duty cycle is then measured as K/N with a resolution of 1/M and an accuracy of $\pm 2(M - N + 1)/(M + N)$. Thus, the best accuracy results from making $M = N$, or synchronizing the local oscillator frequency at N times the fundamental. The best resolution obviously comes from the highest oscillator frequency.

FIG. 3 shows a block diagram of a circuit using this method. It was designed for use in conjunction with a magnetoresistive current detector for sensing an off-hook condition on a telephone line. In this application, the DC. component is either absent or it may be present as a constant fraction of an AC component, so the duty cycle of the waveform in the presence of the AC signal has either of two values; detecting the DC component in the absence of the AC is straightforward. One feature of this realization is that it was partitioned to minimize the costs of frequently replicated parts. In particular, a master oscillator is phase-locked to the ringing voltage to produce pulses at the ringing voltage repetition rate and at N times that frequency. Components are replicated for each line such as a counter, and logic to test the counter for an off-hook condition. The advantage of this approach is that the frequently repeated parts are amenable to large scale integrated circuit construction techniques.

FIG. 3 shows a comparator 10 (preferably a differential amplifier) for receiving the signal on line 11(B) which may have an AC component of frequency F and a DC component which represents the intermittent off-hook signal. In the telephone application, the ratios of AC and DC components are in ranges fixed by the ringing voltage generator, the line battery, and the allowed range of subscriber loop impedances. The output of circuit 10 passes to AND 12.

Oscillator 13 oscillates at frequency MF where M is preferably an integer N such as 63. One method of implementing such a device is to use a phase-locked oscillator 13 operating at frequency NF. The reference frequency F is produced by the ringing voltage generator 8. Oscillator 13 has an output connected to the other input of AND 12 and to the input of divider 14 which divides its input by integer N. Counter 15 counts to N+1 and records all the output of oscillator 13 only while circuit 10 provides a positive output to hold AND 12 open to inputs from oscillator 13. Divider 14 provides an output for a group of N pulses from oscillator 13 causing single shot 16 to produce a store signal to memory 18 which in response thereto stores the value in counter 15 which is reset by a signal from single shot (SS) 17 on the fall of the output of SS 16. Decoder 19 provides an output to the circuit to be controlled in response to the value in memory 18, indicating whether the value in the memory is above or below certain levels selected for indicating whether an off-hook state was present.

FIG. 4A shows an off-hook current waveform for a telephone hand set with no ringing voltage, with a current 15 mA $<I<$ 100 mA, substantially above the zero value shown by a dotted line.

FIG. 4B shows an on-hook current waveform at the zero current level for no ringing voltage.

FIG. 4C shows the off-hook current waveform with a sine wave representing a ringing current biased positive by the current $I_{DC}$ with $I_{AC}$(peak-to-peak) $\approx 5 I_{DC}$.

FIG. 4D shows the on-hook current waveform of zero current with the ringing voltage indicated by the sine wave.

The sensor S measures the duty cycle by using the output of comparator 10 to gate the output of oscillator 13. The cost effectiveness of the circuit is maximized by using a $2^N$ count register (N bits) and operating the local oscillator at $(2^N - 1)$ times the ringing voltage frequency. The system has a 6-bit counter 15 so the local oscillator is operated at 63 times the line frequency.

Among the circuits that need to be built only once to service several off-hook sensors is oscillator 13 that produces pulses at $(2^N - 1)$ times the ringing voltage frequency plus sequential pulses to inspect and clear the registers once in every cycle of the ringing voltage.

The preferred local oscillator circuit is a phase locked loop. For a circuit operating at 20 Hz, oscillator 13 operates at 1260 Hz. This is divided by 63 using the six-stage binary counter with the additional reset electronics. The single shots 16 and 17 activate reset circuits to increase the duration of the reset pulse by the timing delays of the two single shots, which should be much shorter than one period of oscillator 13.

At the end of every cycle of the ringing voltage, the output of the magnitude counter 15 is transferred to storage in a simple, bistable latch memory 18. After latch 18 is updated, the counter 15 is reset to zero for the next cycle of the ringing voltage.

By testing the duty cycle of the waveform once in every cycle of the ringing voltage, the response time of the circuit is guaranteed to be no longer than two ringing voltage cycles. The worst-case example can occur if the receiver is lifted off-hook near the beginning of a period of the off-hook sensor, but late enough to insure that some of the "duty cycle" of the comparator output is lost. The fastest response possible with this circuit will be slightly greater than one-half the cycle of the ringing voltage.

Although the circuit described here employs a magnetoresistive current bridge, it should be obvious that it works satisfactorily without resorting to a magnetoresistive sensor. The only requirement that is not met by the circuit while using a sensor resistor is the need for electrical isolation of the output from the telephone line. However, this requirement can be met easily by using an optoelectronic isolator between the output latch and any additional circuitry.

Before discarding the idea of using a magnetoresistive bridge, some of its advantages should be noted. By proper design, a magnetoresistive bridge can be made with a differential current input, resulting in a reduced sensitivity to common mode currents. In addition, it is possible to completely integrate the magnetoresistive sensor with the electronic sensor circuit, enabling automated adjustments for properly setting the input offsets. Since the magnetoresistive sensor provides the necessary isolation, the number of separate, isolated power supplies required in a system is reduced. And not to be overlooked is the fact that the intrinsic value of the materials used in a magnetoresistive device is less than the value of the materials in an optoelectronic isolator.

What is claimed is:

1. Apparatus for measuring the DC component of an electrical waveform of an input signal comprising a symmetric sine wave signal intermittently combined with a DC signal on a telephone line including
   means for coupling to said telephone line to detect said input signal and providing a measured value in response thereto;
   means for generating pulses of a reference signal having a relatively high frequency as compared with the frequency of said sine wave of said electrical waveform,
   means for comparing said measured value with said reference signal to indicate the value of said DC component with respect to said reference signal,
   said means for comparing having a counter and a plurality of inputs, said counter having inputs and an output, said means for coupling operating a gate at a said input of said means for comparing connected to an input of said counter, said gate being operated as a function of the voltage of said input signal to pass counting pulses of said reference signal to said counter, said means for comparing including means for providing a control signal at the end of a predetermined time for ending the counting by said counter of a given sequence of pulses, and means for measuring the count of reference frequency pulses passed to said means for comparing in said counter during a single positive portion of a wave of said input signal to measure the numerator of the duty cycle of said input signal relative to a predetermined value for detecting the presence of a DC value in said input signal.

2. A telephone line off-hook detector system, including clock means for generating a high frequency master clock signal, means for sensing signals on said telephone line continuously to produce an input signal, comparator means for providing an output during the positive polarity of said input signal, means for recording the duration of an output from said comparator means in response to said positive polarity of said input signal as measured by the sum of signals from said master clock during said positive polarity, and means including a decoder for comparing said sum with a predetermined value after a predetermined interval of time to provide an output indicating an off-hook signal when said sum exceeds said predetermined value.

3. Apparatus in accordance with claim 2 wherein said comparator means provides a positive gating signal when said telephone line has a positive signal thereon with respect to a predetermined level, said means for recording including counter means and gating means, said gating means being coupled to said clock means for gating clocking signals during a positive gating signal to said counter means for providing a count of signals passing through said gating means from said clock means.

4. Apparatus in accordance with claim 3 wherein logic and divider means are coupled to reset said counter and its output after a predetermined interval.

5. Apparatus for measuring the DC component of an electrical waveform of an input signal of a frequency F occasionally combined with an off-hook DC signal component on a telephone line including means for generating a reference signal having a relatively high frequency with a value of MF, where M is an integer substantially larger than one, means for coupling to said telephone line to detect said input signal and for providing a measured value of the duration of the portion of said waveform having a predetermined polarity with respect to a reference value, and means for comparing said duration of said measured value with the duration of MF/N cycles of said reference signal to indicate the value of said DC component with respect to said reference signal, where N is a number selected for purposes of comparision.

6. Apparatus for detecting the off-hook signal on a telephone line including comparator means having an input and an output for providing an output signal during the positive portion of the duty cycle of a continuous wave signal occasionally in combination with a DC off-hook signal on said telephone line, counting means having an input connected to the output of said comparator apparatus for measuring the numerator of a duty cycle during a single half-cycle and an output for providing said numerator at the output thereof, and means for decoding said numerator at the output of said counting means to indicate the off- and on-hook status of input signals to said comparator means.

7. A telephone line off-hook detector system, with a ringing signal of frequency F, including clock means for generating clock pulses at a high frequency MF where M is a large integer, means for sensing signals on said telephone line continuously to produce an input signal, comparator means for providing an output during the positive polarity of said input signal, an AND gate having inputs connected to said clock means and the output of said comparator means, counter means for recording the output of said AND gate thereby recording the count of the duration of an output from said comparator means in response to said positive polarity of said input signal as measured by the sum of the number of clock pulses from said clock during said positive polarity, said counter means having an input connected to the output of said AND gate, an output and a reset line for resetting its count to zero, a frequency divider for dividing by an integer N having an input connected to said clock means and an output coupled to said reset line of said counter, memory means for storing a count of a duration measured by said counter having an input connected to the output of said counter, an output, and a reset line, said reset line being coupled to the output of said divider, and decoder means having an input connected to the output of said memory means for discriminating between higher counts stored in said memory means having values high enough to indicate presence of an off-hook signal with a high duty cycle and lower counts stored therein and indicating an average duty cycle.

* * * * *